(12) United States Patent
Kato et al.

(10) Patent No.: US 7,826,662 B2
(45) Date of Patent: Nov. 2, 2010

(54) DIGITAL CAMERA PROVIDED WITH GRADATION CORRECTION FUNCTION

(75) Inventors: Yoshiyuki Kato, Higashiyamato (JP); Tomohiko Murakami, Kokubunji (JP); Takeshi Sato, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 1044 days.

(21) Appl. No.: 11/584,441

(22) Filed: Oct. 20, 2006

(65) Prior Publication Data

US 2007/0092154 A1    Apr. 26, 2007

(30) Foreign Application Priority Data

Oct. 26, 2005    (JP)    ................. 2005-310924

(51) Int. Cl.
*G06K 9/00* (2006.01)

(52) U.S. Cl. ...................................... 382/168

(58) Field of Classification Search ............. 358/1.9, 358/1.18, 518–522; 348/222.1, 223.1, 229.1, 348/234, 252–254, 671–672; 382/162, 167, 382/168, 169, 172, 254, 274, 312

See application file for complete search history.

(56) References Cited

U.S. PATENT DOCUMENTS

| | | | | |
|---|---|---|---|---|
| 6,111,980 A * | 8/2000 | Sano et al. | ................. | 382/167 |
| 6,266,102 B1 * | 7/2001 | Azuma et al. | ............... | 348/671 |
| 7,251,056 B2 * | 7/2007 | Matsushima | ................ | 358/1.9 |
| 7,349,119 B2 * | 3/2008 | Tsukioka | ................... | 358/1.18 |
| 7,352,398 B2 * | 4/2008 | Sano | .......................... | 348/254 |

FOREIGN PATENT DOCUMENTS

JP    7-274062 A    10/1995

* cited by examiner

*Primary Examiner*—Jose L Couso
(74) *Attorney, Agent, or Firm*—Holtz, Holtz, Goodman & Chick, PC

(57) ABSTRACT

A histogram is generated from image data, and two distribution areas are detected. A gamma curve used for gamma correction of the image data is changed into a gamma curve corresponding to the luminance ranges of the two distribution areas. The luminance values of each pixel in the two distribution areas are converted by the gamma correction using the changed gamma curve, and the luminance ranges of the two distribution areas are expanded to the higher luminance side while the relative relation of the luminance the pixels is maintained.

16 Claims, 6 Drawing Sheets

DIGITAL CAMERA PROVIDED WITH GRADATION CORRECTION FUNCTION

CROSS-REFERENCE TO RELATED APPLICATIONS

This application is based upon and claims the benefit of priority from prior Japanese Patent Application No. 2005-310924, filed Oct. 26, 2005, the entire contents of which are incorporated herein by reference.

BACKGROUND OF THE INVENTION

1. Field of the Invention

The present invention relates to a digital camera provided with a gradation correction function, and a gradation correction method and a program used therefor.

2. Description of the Related Art

Conventionally, a digital camera includes a built-in flash unit to compensate insufficiency of light for photographing. However, because the reach of the flash is limited, sufficient amount of light may not be obtained when photographing an object which is far away from the camera or photographing wide range. The downsizing of digital cameras in recent years leads to the downsizing of flash units, and the amount of light becomes smaller. Moreover, the downsizing of digital cameras causes the downsizing of cell-size of an imaging sensor, and photographic sensitivity decreases. Therefore, the amount of light is insufficient in spite of using a flash, and expected brightness cannot be obtained in many cases. In order to solve the problem, there is a method to control the exposure at the time of photographing in Jpn. Pat. Appln. KOKAI Publication No. 07-274062. According to the technique described in the above reference, for example, exposure is controlled by controlling an aperture and a shutter in such a way that an object with the highest luminance becomes the brightest within a dynamic range of about 70% through 100% of the image sensor, that is, within a range in which saturation is not caused, regardless of the luminance distribution and the position in an image. Thus, an appropriate exposure for a bright object and also for a dark object may be obtained without any correction.

However, because the above-described method merely adjusts the exposure to be high within a range in which the gradation of an area corresponding to a bright object can be maintained, the result of photographing is not always preferable. In this method, an aperture and a shutter are controlled only for adjustment of brightness before photographing. Accordingly, the brightness may not be appropriately corrected for an image including an object which does not receive enough light when photographing. For example, when an image has a short-distance area (main object) which is irradiated enough with a flash, and a long-distance area (background) which light of a flash does not reach, such as when photographing a night scene, the portion of the object which is at a short distance is bright enough by the flash, but the portion of the object which is at a long distance is left dark because the flash does not reach the portion. Therefore, there is a problem that a gradation of the dark long-distance area is extremely poor, although a gradation of the bright short-distance area can be maintained.

BRIEF SUMMARY OF THE INVENTION

According to an embodiment of the present invention, an image capturing apparatus comprises:

an image capturing unit which captures an image of an object and outputs image data;

a histogram generating unit which generates a histogram showing a luminance distribution of the image data output from the image capturing unit;

a detecting unit which detects a first range of luminance levels at which the number of pixels is more than a predetermined threshold level and a second range of luminance levels at which the number of pixels is not more than the predetermined threshold level; and a correction unit which converts a luminance of the image data output from the image capturing unit into an output luminance according to a predetermined conversion characteristic when an operation mode is set to a first mode, and to convert a luminance of the image data into an output luminance when the operation mode is set to a second mode in such a manner that an output luminance range corresponding to the first range is wider than an output luminance range according to the predetermined conversion characteristic and an output luminance range corresponding to the second range is narrower than an output luminance range according to the predetermined conversion characteristic.

According to another embodiment of the present invention, an image capturing apparatus comprises:

an image capturing unit which captures an image of an object and outputs image data;

a histogram generating unit which generates a histogram showing a luminance distribution of the image data output from the image capturing unit;

a detecting unit which detects a distribution area distributed in the histogram generated by the histogram generating unit; and a first gradation correction unit which corrects gradation by changing a luminance value of a pixel in a portion of the image data corresponding to the distribution area detected by the detecting unit such that a luminance difference between pixels is increased while a relative relation of the luminance value of the pixels is maintained.

DETAILED DESCRIPTION OF THE INVENTION

Figure 1:
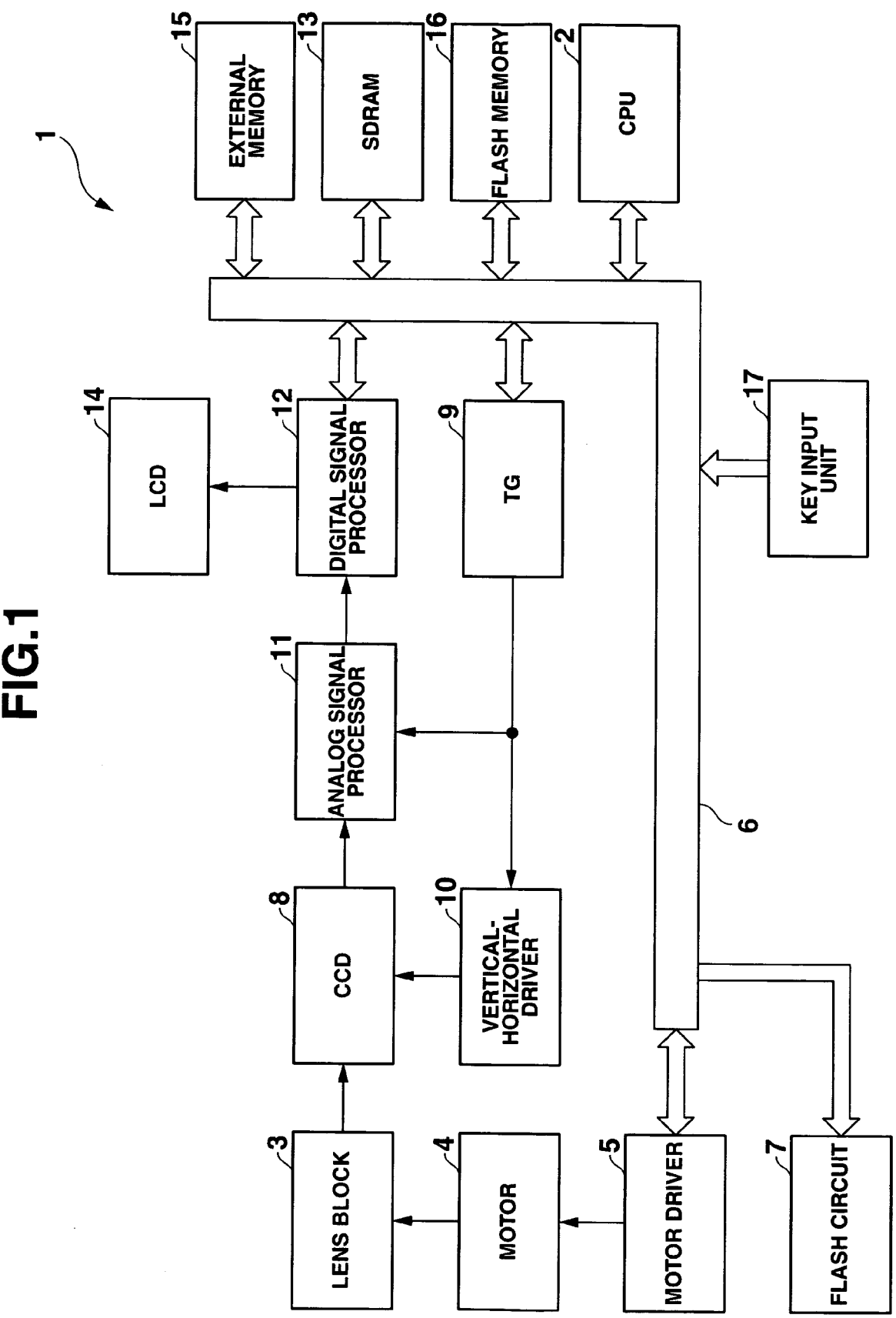
FIG. 1 is a schematic block diagram showing the electric configuration of a digital camera 1.

Hereinafter, an embodiment according to the present invention is explained referring to the drawings. FIG. 1 is a schematic block diagram showing the electric configuration of a digital camera 1.

The digital camera 1 is formed with the following components including a CPU 2, as a principal component, which controls the entire system. A lens block 3 represents driving mechanism of an optical system including retractable zoom and focus lenses. A motor driver 5 controls the driving of a motor 4 for driving the driving mechanism and is connected to the CPU 2 through a bus 6. The optical system moves in the direction of an optical axis by driving of the motor 4 caused by the driver 5 according to a control signal from the CPU 2. Moreover, a flash circuit 7 (a flash generator) including a stroboscopic lamp which generates a flashlight as required, the driving circuit therefor, and the like is connected to the bus 6.

The digital camera 1 has a CCD 8 as image capturing unit. A timing generator (TG) 9 generates a timing signal according to an instruction from the CPU 2. The CCD 8 is driven by a vertical-horizontal driver 10, based on the timing signal, and outputs an analog captured image signal corresponding to an optical image of the object formed by the optical system to an analog signal processor 11. The analog signal processor 11 is equipped with a correlated double sampling (CDS) circuit which removes noise included in the output signal from the CCD 8 by correlated double sampling, an analog-digital converter which converts the captured image signal subjected to the noise removing into a digital signal, and the like. The captured image signal converted into a digital signal is outputted to a digital image processor 12.

The digital image processor 12, processes the inputted captured image signal by operations such as a pedestal clamp operation, converts the processed signal into a luminance (Y) signal and a color difference (UV) signal, and performs digital processing such as auto white balance processing, gamma characteristic (gradation) correction of the CCD 8, pixel interpolation processing, and the like. The YUV data obtained by the digital image processor 12 are sequentially stored into a synchronous dynamic random access memory (SDRAM) 13. In a record (REC) mode for photographing, each time one frame of data (image data) is accumulated in the digital image processor 12, the data is converted into a video signal, and transferred to a liquid crystal display (LCD) 14 to be displayed as a through image.

In photographing processing which is started by pushing a shutter key, the image data (YUV data) temporarily stored in the SDRAM 13 is compressed by the CPU 2, and accumulated temporarily in a buffer area (hereinafter, called an image buffer) in the SDRAM 13. Thereafter, the image data is finally recorded in an external memory 15 as an image file in a predetermined format. The external memory 15 is a removable memory card which is connected to a camera body through a card interface (not shown). The image file recorded in the external memory 15 is read out into the CPU 2 for decompression in response to a selection operation by a user in a playback mode, is expanded into the SDRAM 13 as YUV data, and is displayed on the LCD 14.

A flash memory 16 is a program memory and, at the same time, a built-in image memory. A program area and an image storing area are provided in the flash memory 16. When the external memory (memory card) 15 is not attached, a captured image (image data after compression) is stored in the image storing area. In the present embodiment, the external memory 15 works as a main image storing unit.

Programs and data by which the CPU 2 controls the whole camera are stored in the program area. In the present embodiment, programs which causes the CPU 2 to work as detector, characteristic generator (first generator and second generator), and controller are stored. The program area also stores the data necessary for the operations to be described later.

Furthermore, in addition to the above-described programs and data, setting data for various kinds of functions of the digital camera 1, and the setting data which is set according to a setting operation by a user or in an automatic manner are stored in the program area.

The digital camera 1 has a key input unit 17 including a shutter key, a power key, a mode switching switch, a zoom-up and zoom-down button, and the like, which are not shown in the drawing. When any of the operation keys is operated by a user, the key input unit 17 sends an operation signal corresponding to the content of the operation to the CPU 2.

Figure 2:
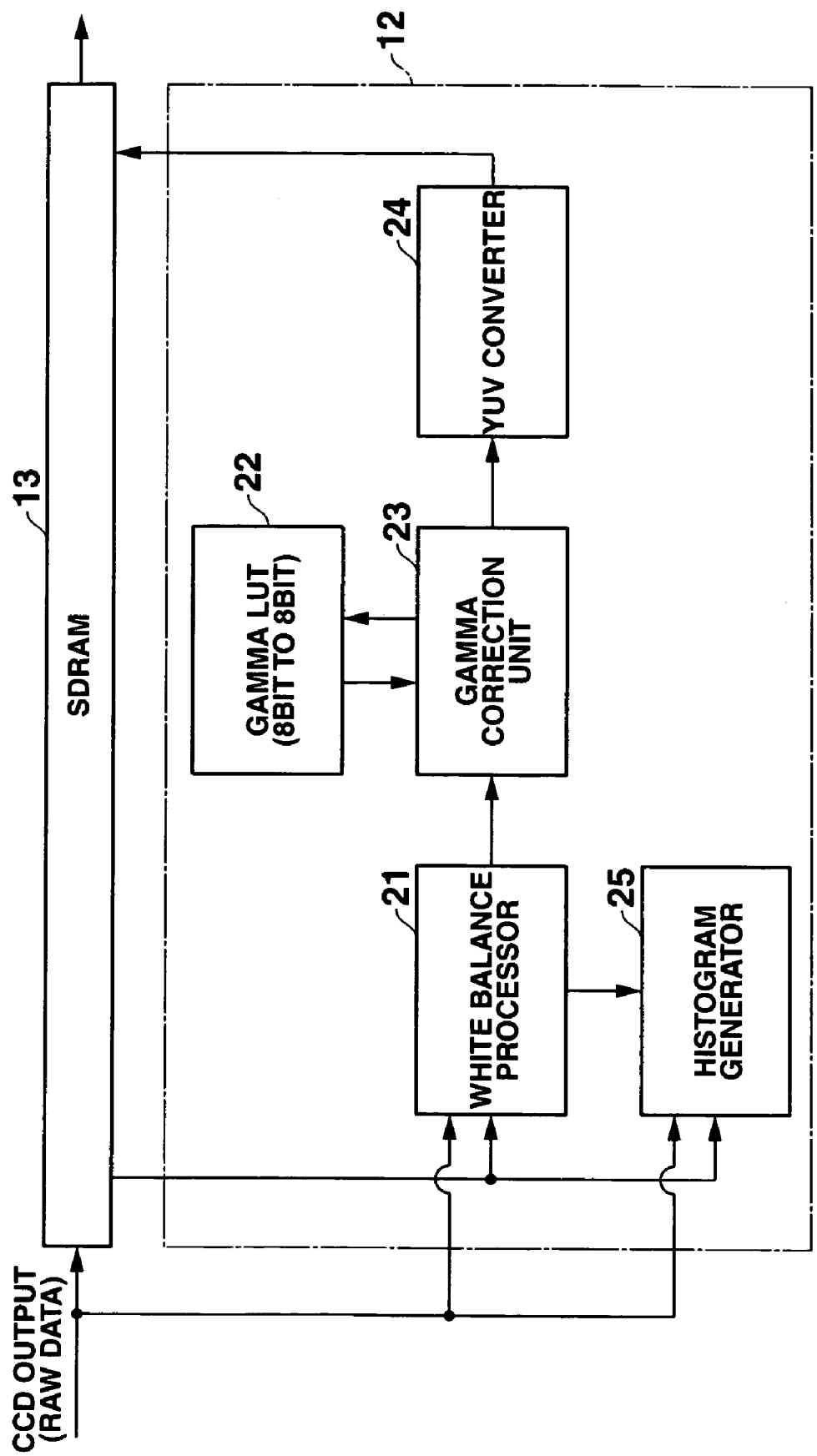
FIG. 2 is a block diagram showing the configuration of a digital signal processor 12 in the digital camera 1.

FIG. 2 is a block diagram showing the configuration of the digital image processor 12. Here, the CPU 2, the bus 6, and the like are omitted for plain expression of the data flow between the digital image processor 12 and the SDRAM 13. A CCD output in the drawing means an unprocessed digital image data (hereinafter, called a RAW data) outputted from the CCD 8 through the analog signal processor 11 at the time of photographing.

After this RAW data is temporarily stored in the image area of the SDRAM 13 which is used as a buffer memory, the data is read out therefrom to the digital signal processor 12 for processing. The digital camera 1 can be configured that the RAW data is directly processed in the digital signal processor 12 without being stored in the image area of the SDRAM 13. The buffer memory is not limited to the SDRAM 13, and may be configured to be a DRAM and the like. The memory is not especially limited to the above configuration.

The digital signal processor 12 is formed with a one-chip large scale integrated circuit (LSI), and includes a white balance processor (WB processor) 21 which multiples the RAW data by a predetermined WB gain, a gamma lookup table (LUT) 22 which stores the data for luminance conversion characteristics (gamma curve) from 8 bits to 8 bits, a gamma correction unit 23 which performs gradation correction of the RAW data subjected to the WB gain multiplication referring to the gamma lookup table 22, a YUV converter 24 converts the RAW data subjected to the gradation correction into a YUV signal, and a histogram generator 25 which generates a histogram showing pixel distribution by luminance level for the RAW data after multiplication of the WB gain by the white balance processor 21.

All or a part of the above-described processing performed in the digital signal processor 12 may be performed using software at the CPU 2 in consideration of versatility, size of the device, cost and the like. However, if software executes all the processing, a processing loads of the CPU 2 becomes quite heavy and it takes much time. Basic processing in the white balance processor 21, the gamma correction unit 23 and the YUV converter 24 is preferably performed using hardware, in the same manner as that of the present embodiment.

Figure 3:
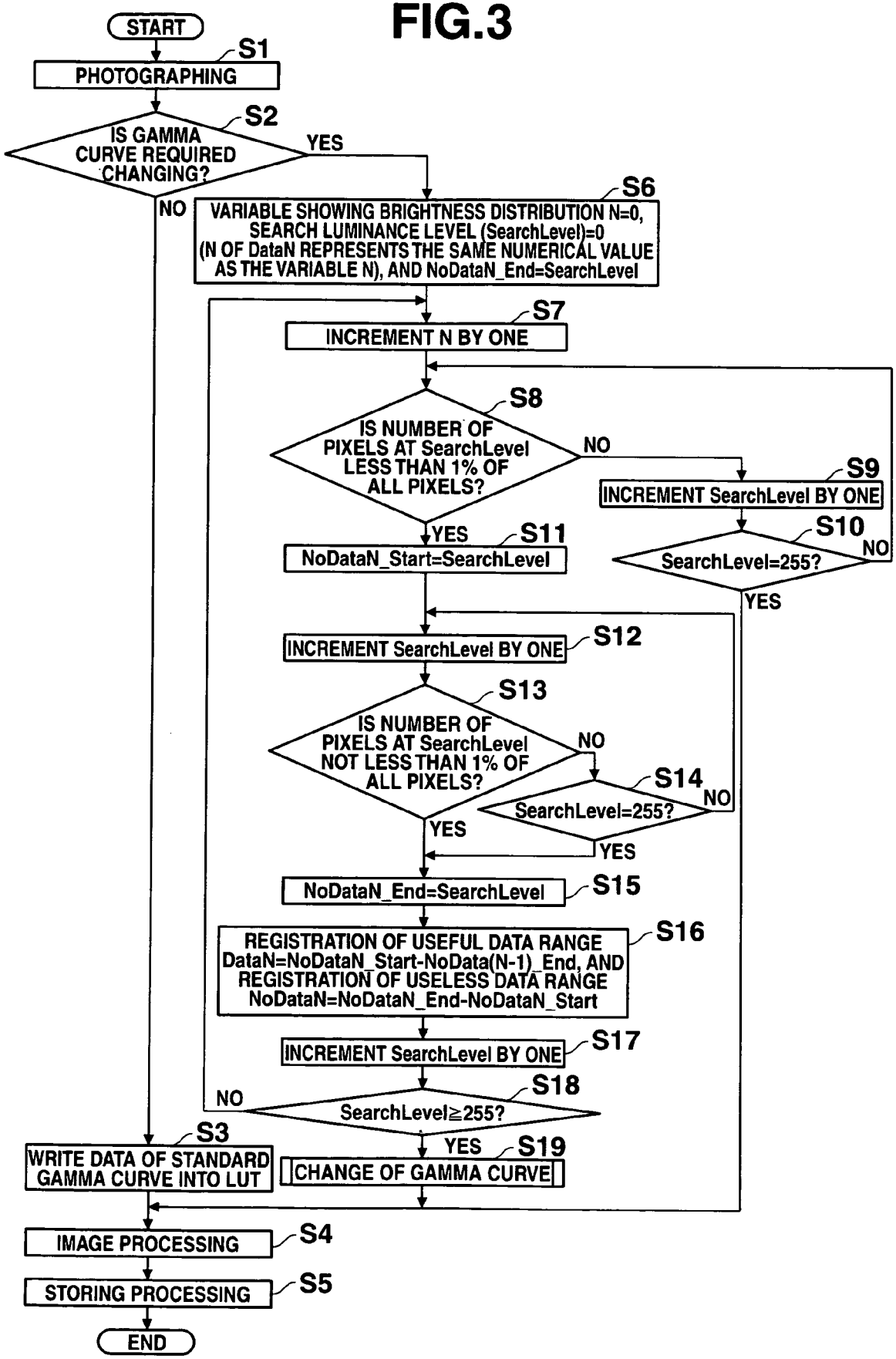
FIG. 3 is a flow chart of signal processing performed at the time of photographing in the digital camera 1.

Subsequently, operations of the digital camera 1 with the above-described configuration are explained. FIG. 3 is a flow chart of signal processing performed at the time of photographing in the digital camera 1.

In the case of photographing a still image, the CPU 2 adjusts exposure by setting the parameters such as a shutter speed and an aperture, performs photographing processing when the shutter key is depressed, and obtains the RAW data which is the digital image data from the CCD 8 through the analog signal processor 11 (step S1). This RAW data is temporarily stored in a predetermined area of the SDRAM 13 through the digital signal processor 12, or directly.

Then, the CPU 2 determines whether the gamma curve is required to be changed (step S2). In the present embodiment, in the case that a user selects a photograph mode with a compulsory generated flash light, and in the case that the exposure adjustment is set to require a flash light, it is determined that the gamma curve is required to be changed. However, it can be selected by the user whether or not to change the gamma curve. Requirement of the change of the gamma curve can be determined also on the basis of the flash-light emitting condition and/or the setting condition by the user.

Photographing using a flash at night creates two kinds of areas in the image data. One corresponds to a portion of the object which is at a short distance, such as a person, and the other corresponds to a portion of the object which is at a long distance, such as a building or a mountain. The portion of the object at a short distance, such as a person, appears brighter than the actual brightness because the flash irradiates strongly the person. However, the portion of the object at a long distance, such as a building or a mountain, appears dark as is because the flash does not reach.

In the histogram which represents the luminance distribution of the image data, two distribution areas exist locally at the higher and lower sides of luminance respectively. Most of pixels included in the distribution areas at the higher side of luminance correspond to the portion of the object at a short distance, such as a person. Most of pixels included in the distribution area at the lower side of luminance correspond to the portion of the object at a long distance, such as a building or a mountain. Few pixels distribute between the two distribution areas.

Thus, in the case of photographing using a flash at night, it can be concluded that there is strong correspondence between the two areas of the image data and the two distribution areas of the histogram. The area representing the portion of the object at a short distance in the image data corresponds to the distribution area at the higher side of luminance in the histogram. The area representing the portion of the object at a long distance in the image data corresponds to the distribution area at the lower side of luminance in the histogram.

Thereby, when photographing with a flash at night, without complex image processing by software, the numbers of pixels subjected to the erroneous gradation correction can be reduced, by merely rewriting the gamma lookup table provided in the gamma correction unit realized by hardware, and the gradation correction may be appropriately executed. That is, there is no need to perform image processing by software, such as image recognition processing to discriminate the portion of the object at a short distance from the portion of the object at a long distance, and to execute different gradation corrections for the two portions respectively.

However, when the gradation correction by rewriting the gamma lookup table is performed only on assumption of photographing with a flash at night, there is a possibility, depending on photographing conditions, that the gradation correction may not be appropriately performed. Moreover, even in cases excluding a case of photographing with a flash at night, there is a case in which gradation correction may be appropriately performed, using the gradation correction by rewriting the gamma lookup table. Thereby, in the present embodiment, it is possible to designate whether or not to execute the gradation correction according to an instruction of a user. It is determined whether to perform the processing, on the basis of a photographing condition under emission of strobe light or a setting condition by a photographer. However, it may be determined whether to perform the processing, on the basis of a photographing condition under emission of strobe light and a setting condition by the photographer.

Figure 5A:
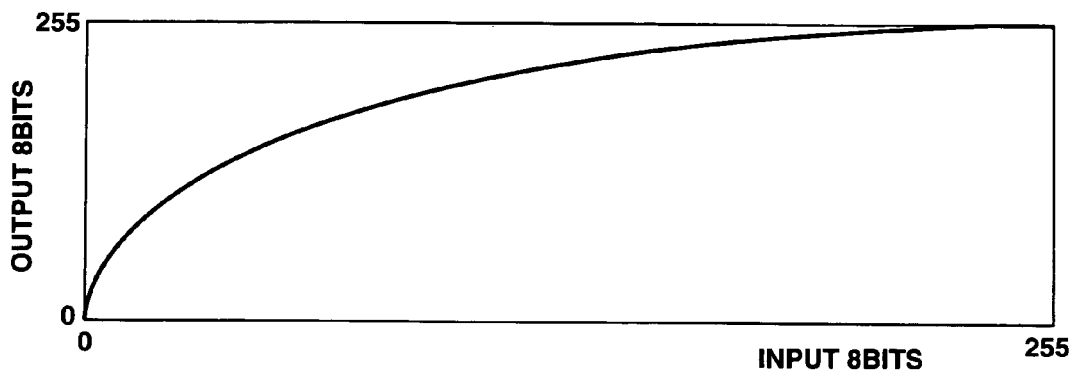
FIG. 5A is a view of a standard gamma curve.

When it is determined that the gamma curve is not required to be changed based on the above-described condition or ("NO" at step S2), the CPU 2 writes the standard gamma curve data into the gamma lookup table (LUT) 22 of the digital signal processor 12 (step S3). FIG. 5A is a view showing the above-described standard gamma curve.

Subsequently, the CPU 2 provides the RAW data read out from the SDRAM 13 for the digital signal processor 12 to perform an image processing such as white balance processing, gamma correction, and YUV conversion (step S4). The image processing is performed as follows. The white balance processor 21 performs a color adjustment by multiplying the RAW data read out from the SDRAM 13 by white balance gain (WB gain) for each of RGB colors. Thereafter, gradation correction for the image data subjected to the color adjustment is performed in the gamma correction unit 23 according to the gamma curve (here, the standard gamma curve) written into the gamma lookup table (LUT) 22. The YUV converter 24 converts the image data subjected to the gamma correction into a luminance signal Y representing brightness of the image and a color difference signal U, V (Cb, Cr) representing color of the image and outputs the YUV signals to a predetermined area in the SDRAM 13.

Thereafter, the CPU 2 reads out the luminance and color difference signals from the SDRAM 13 for compression by a predetermined method and for recording in the external memory 15 as a captured image file (step S5).

On the other hand, for example, when a photograph mode with a compulsory generated flash light is selected and thus it is determined that the gamma curve is required to be changed ("YES" at step S2), the CPU 2 executes the following processing. That is, the CPU 2 changes the standard gamma curve shown in FIG. 5A into a gamma curve for gradation correction shown in FIG. 5C. After that, the CPU 2 causes the digital signal processor 12 to execute the above-described image processing.

Figure 6A:
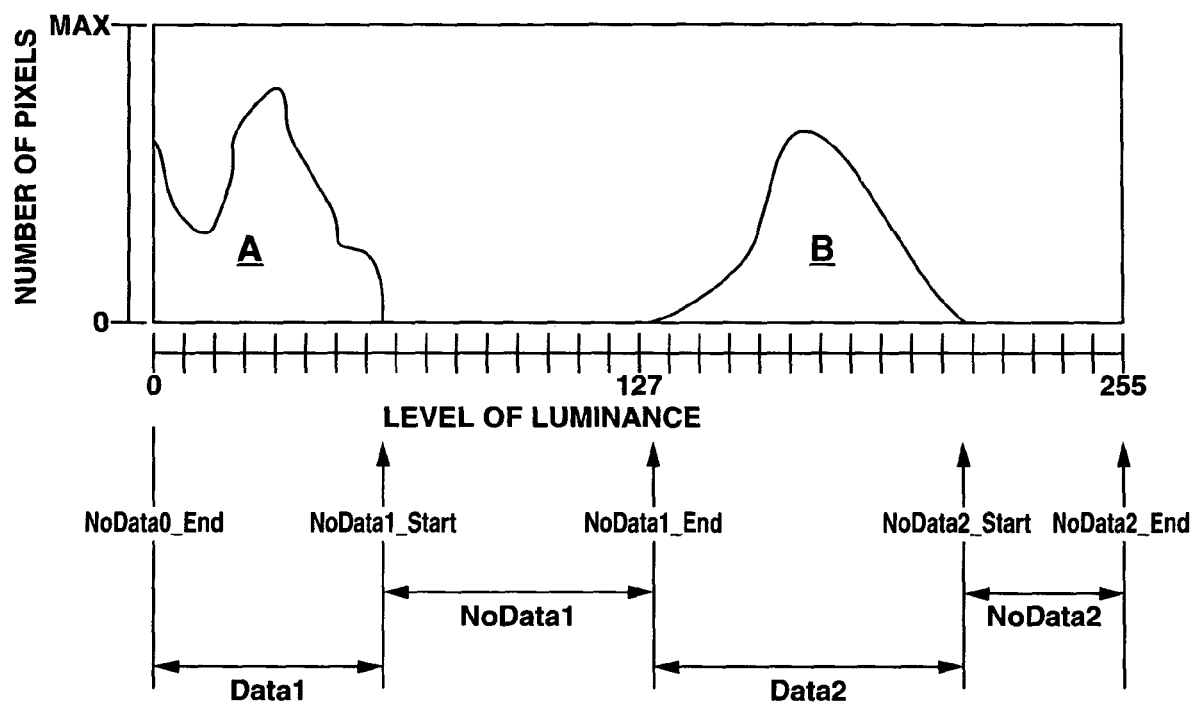
FIG. 6A is a histogram of a captured image.

That is, by processing of steps S6 through S19, the CPU 2 searches for a useful data range and a useless data range in the histogram of the captured image generated by the histogram generator 25. The useful data range is a range of luminance levels at which the number of pixels is more than a predetermined threshold level, and the useless data range is a remaining range, i.e., a range of luminance levels at which the number of pixels is not more than the predetermined threshold level. When two useful data ranges A and B locally exist in the histogram as shown in FIG. 6A, for example, the range A at the lower luminance side is called a first useful data range (Data1), and the range B at the higher luminance side is called a second useful data range (Data2). Moreover, a useless data range existing between the first and second useful data ranges (Data1 and Data2) is called a first useless data range (NoData1), and a useless data range locating at the higher luminance side than the second useful data range is called a second useless data range (NoData2).

Hereinafter, details of the processing are described. The CPU 2 initializes a variable N (sets "0") which expresses the number of the useful data ranges (number of blocks in the distribution) on the histogram of the captured image, and also initializes a search luminance level (SearchLevel) used for searching the useful data range and the useless data range. The search luminance level (SearchLevel) is substituted into a variable NoData0_End which is required for the later operations (step S6).

Then, the number of blocks N is incremented by one (step S7), and searching for the first useless data range is started. It is determined whether the number of pixels at the set search luminance level (SearchLevel) ("0" when the processing is started) is less than 1% of the number of all pixels of the captured image (step S8). When it is determined that the number of pixels at the level is not less than 1% ("NO" at step S8), the search luminance level (SearchLevel) is incremented by one (step S9), and the above-described determination is repeated till the search luminance level (SearchLevel) is equal to 255 ("NO" at step S10).

Meanwhile, when it is determined that the number of pixels at any of the search luminance levels becomes less than 1% of all the pixels ("YES" at step S8), the search luminance level (SearchLevel) at that time is set (recorded) as the value of NoDataN_Start (NoData1_Start at the starting point of the processing) represents the starting (lowest) luminance level of the useless data range (step S11).

Subsequently, the search luminance level (SearchLevel) is incremented by one (step S12). Then, it is determined whether the number of pixels at the search luminance level (SearchLevel) after the increment is 1% or more of all the pixels (step S13). Then, when it is determined that the number of pixels is not 1% or more of all the pixels and that the search luminance level (SearchLevel) is not equal to 255 ("No" at steps S13 and S14), the flow returns to step S12 and the search luminance level (SearchLevel) is further incremented by one. Thereafter, the determination at step S13 is repeated. When it is determined that the number of pixels at the search luminance level (SearchLevel) after the increment becomes 1% or more of all the pixels, that is, when the useless data range is ended ("YES" at step S13), the search luminance level (SearchLevel) at that time is set (recorded) as NoDataN_End (NoData1_End at the starting point of the processing) represents the terminating (highest) luminance level of the useless data range (step S15). Moreover, when the determination result at step S14 becomes "YES" while the processing of steps S12 through S14 is repeated, the maximum value (255) is set as NoDataN_End (step S15).

In the present embodiment, it is determined whether a luminance level belongs to the useful data range or the useless data range on the basis of a ratio of the number of pixels at the luminance level to the number of all the pixels of captured image. The threshold which is a criterion for determination is assumed to be 1%. However, the threshold may be appropriately changed. The threshold is not limited to the ratio, but may be changed to a predetermined number of pixels. Moreover, if the number of all the pixels of the captured image is fixed, the ratio is equal to the number of pixels. The threshold may be set (specified) by a user beforehand or at any given time. Moreover, the threshold may be automatically changed based on the types of the captured images. For example, when an important area such as a central area of the captured image, a focus area, or an area detected as a face of a person includes a lot of pixels of the luminance level within the useless data range, the threshold may be raised. Furthermore, the threshold may be set respectively for each brighter and darker side of predetermined luminance value.

The useful data range (DataN), and the useless data range (NoDataN) are registered (recorded) by the above-described processing (step S16). The NoDataN, which is difference between NoDataN_End and NoDataN_Start, represents the width of luminance of the N-th useless data range. The DataN, which is difference between NoDataN_Start and NoData(N−1)_End, represents the width of luminance of the N-th useful data range.

Thereafter, the search luminance level (SearchLevel) is incremented by one (step S17). When the search luminance level (SearchLevel) after the increment is less than the maximum value (255) ("NO" at step S18), the flow returns to step S7 and the above-described processing is repeated. Then, the second or subsequent useful data ranges, and the second or subsequent useless data ranges are sequentially searched, and registered (recorded). When the search luminance level (SearchLevel) becomes the maximum value (255) or more while the above-described processing is repeating ("YES" at step S18), the gamma curve is changed (step S19).

Figure 4:
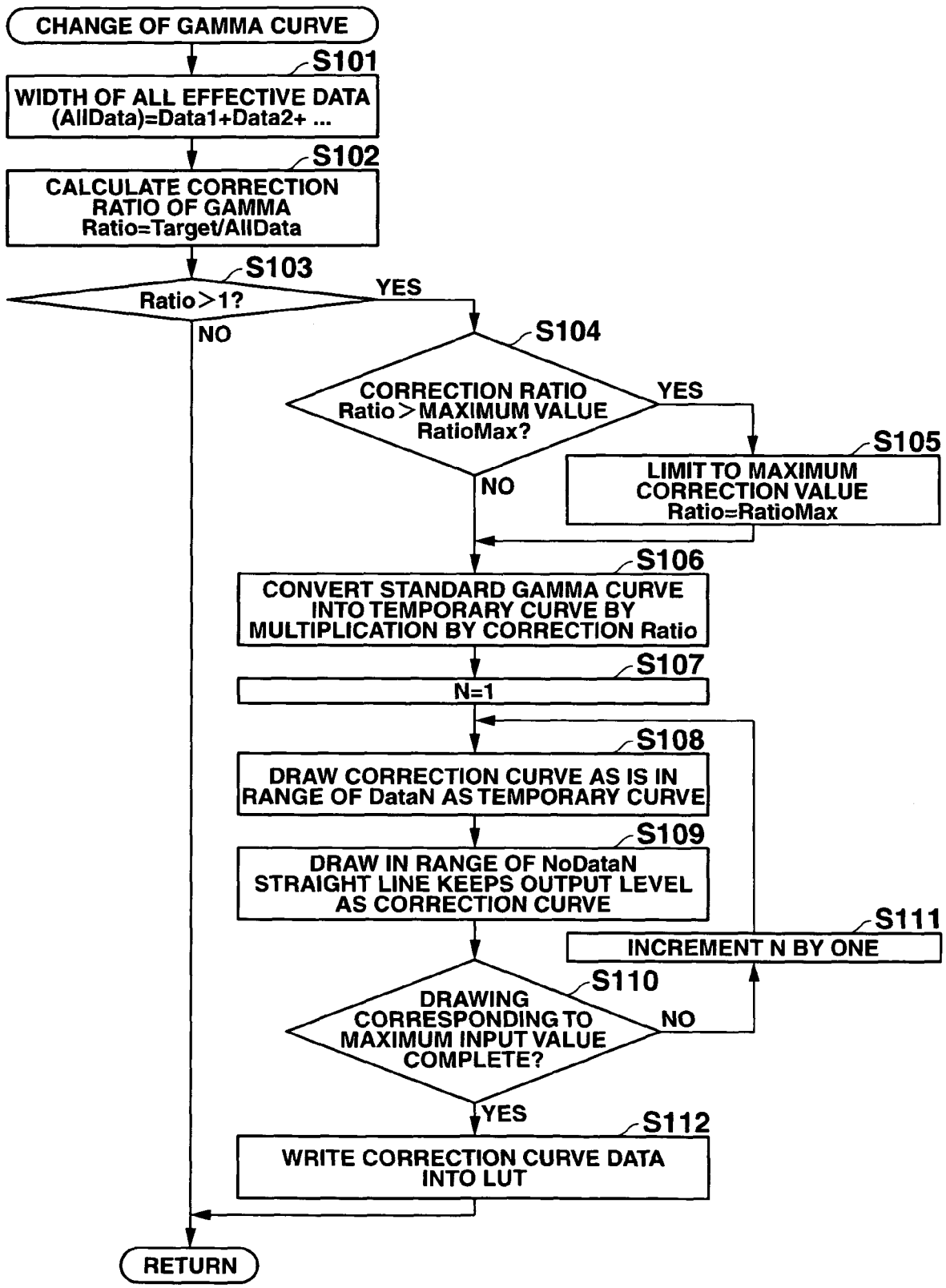
FIG. 4 is a flow chart showing the details of a gamma curve changing processing of step S19 in FIG. 3.
Figure 5B:
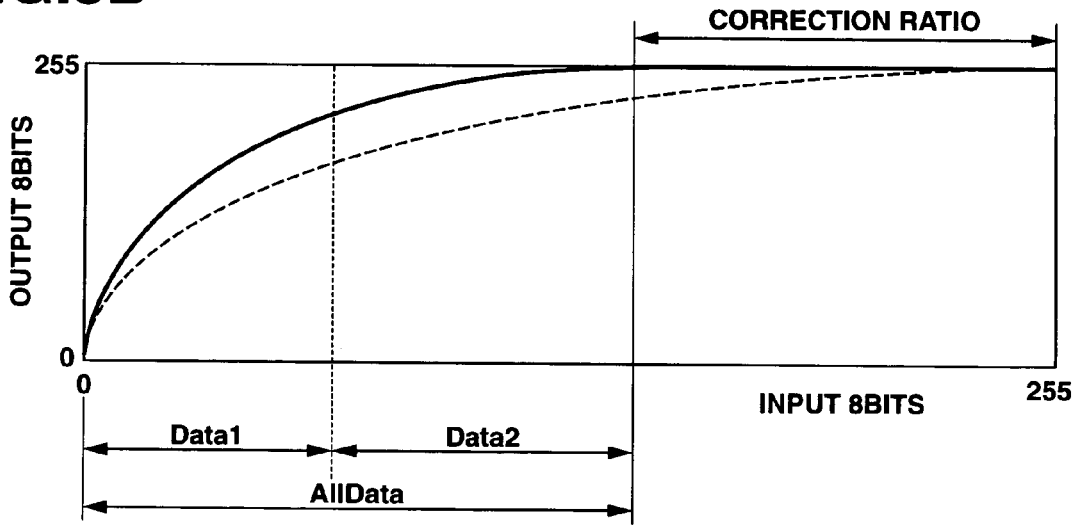
FIG. 5B is a view of a temporary gamma curve.

FIG. 4 is a flow chart showing the content of the gamma curve changing processing of step S19. In the processing, the width of all useful data ranges (AllData) is obtained by addition of all the widths of the useful data ranges (Data1, Data2, . . . ) on the histogram (step S101). Subsequently, a correction ratio (Ratio) is obtained to change the data of the standard gamma curve shown in FIG. 5A. The change ratio is required to change the standard gamma curve in such a manner that an output luminance level corresponding to the maximum input luminance becomes a predetermined target luminance (Target), while an output luminance level corresponding to the minimum input luminance (0) keeps to be the minimum value (0). That is, the standard gamma curve shown by a dashed line in FIG. 5B is changed, without changing the output range, in such a way that the input range is narrowed into the width of all useful data ranges (AllData), and a curve shown by a solid line in FIG. 5B is obtained. The correction ratio (Ratio) is calculated by the following formula (step S102):

$$Ratio = Target/Alldata$$

Subsequently, it is determined whether the calculated correction ratio (Ratio) is larger than 1. When the ratio is not larger than 1, namely when a number of pixels larger than a predetermined number exist at all the luminance levels in the histogram (whole range is the useful data range) ("NO" at step S103), changing of the gamma curve is stopped, and the flow returns to the processing shown in FIG. 3. Then, the digital signal processor 12 is caused to perform the normal image processing with the gamma correction (gradation correction) by the gamma correction unit 23 according to the standard gamma curve, that is, image processing similar to that of a case when it is determined at step S2 that the gamma curve is not required to be changed (step S4). Thereafter, the image after the processing is recorded in the external memory 15 (step S5).

On the other hand, when the correction ratio (Ratio) is larger than 1 ("YES" at step S103), it is successively determined whether the correction ratio (Ratio) is larger than the predetermined maximum correction ratio (RatioMax) (step S104). When the calculated correction ratio (Ratio) is larger than the maximum correction ratio (RatioMax) ("YES" at step S104), the correction ratio (Ratio) is changed to the maximum correction ratio (RatioMax) (step S105). Thus, the degree of the changing of the gamma curve can be limited within a predetermined range when the captured image is completely dark.

Subsequently, the standard gamma curve is converted into a temporary gamma curve by multiplying the standard gamma curve by the correction ratio (Ratio) calculated at step S102, or the correction ratio (Ratio) changed at step S105 (step S106). That is, the data of the standard gamma curve is extracted in an internal memory (or, it can be the work area in the SDRAM 13), and the data is replaced by the data corresponding to the correction ratio (Ratio). Thereafter, data for drawing a correction curve finally used is generated by the following procedures, using the data of the temporary curve. At step S107, the variable N is set to 1 (step S107). Subsequently, for the input luminance within the useful data range represented by the variable N (DataN), the data of the output curve corresponding to the input range is generated to draw the data of the temporary correction curve (step S108). Moreover, for the input luminance within the useless data range represented by the variable N (NoDataN), the data of the correction curve is generated to draw a straight line in such a way that the output luminance maintains the output luminance level of the temporary curve corresponding to the maximum input luminance in the useful data range (DataN) (step S109). Furthermore, the processing at steps S108 and S109 is repeated after incrementing the variable N by one (step S111) till the variable N reaches the maximum value (number of distribution groups) ("NO" at step S110).

Figure 5C:
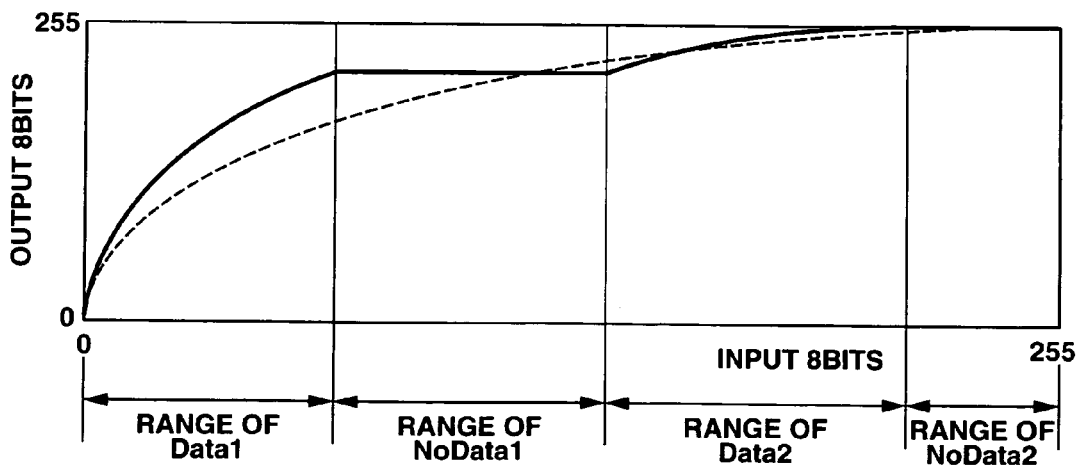
FIG. 5C is a view of a gamma curve for gradation correction.

Thereby, data of the correction curve shown by a solid line in FIG. 5C is newly generated (the standard gamma curve is represented by a dashed line). The gamma curve is generated in such a way that only one output luminance level is allocated to the input luminance levels within the useless data range, and more output luminance levels are allocated to the input luminance levels within the useful data range. The solid line in FIG. 5C represents a correction curve which is generated when the correction ratio (Ratio) calculated at step S102 is used without correction at step S105 in the above-described processing.

When the generation of the data of the correction curve is completed ("YES" step S110), the generated data of the correction curve is written into the gamma lookup table 22 in the digital signal processor 12 (step S112). Thereby, the change of the gamma curve is completed, and the flow returns to the processing shown in FIG. 3. Thereafter, the digital signal processor 12 is caused to execute the gradation correction) according to the correction gamma curve (step S4), then the processed image is recorded in the external memory 15 (step S5).

Figure 6B:
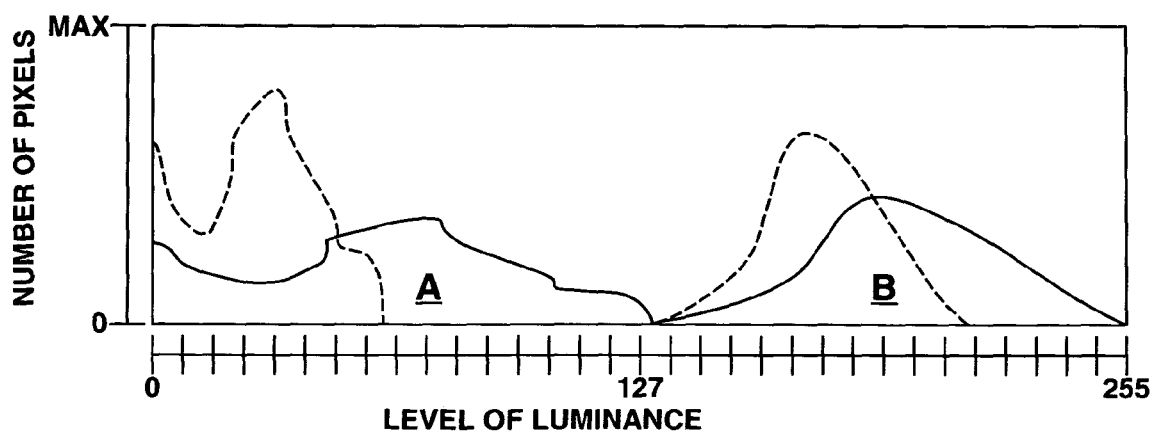
FIG. 6B is a histogram of a captured image after a gamma curve correction processing.

FIG. 6B is a schematic view showing the histogram of the captured image subjected to the processing at step S4 after the gamma curve is corrected. The histogram before the processing is shown in FIG. 6A indicating one example in which there are two distribution areas A and B separated from each other. In this case, by performing gamma correction (gradation correction) according to the correction curve, each of the both distribution areas A and B is extended to the side of the higher luminance to eliminate the useless data ranges located on the higher luminance side of each distribution area before the processing. The area of each of the distribution areas A and B after the processing is the same as that before the processing.

Here, FIG. 6B shows the example in which the level of the target luminance (Target), which is used for calculating the correction ratio (Ratio) at step S102, is the maximum (255). When the target luminance (Target) is less than the maximum level, "220" for example, the highest luminance of the output range corresponding to the distribution area B becomes "220". Accordingly, the highest luminance of the output range corresponding to the distribution area A is separated from the lowest luminance of the output range corresponding to the distribution area B.

As described above, in the present embodiment, when the distribution area A on the dark side and the distribution area B on the bright side are locally distributed as shown in FIG. 6A in the histogram of the captured image using a flash, the histogram (output histogram) is be automatically corrected such that each of the distribution areas A and B is extended to the higher luminance side as shown in FIG. 6B, by performing gamma correction (gradation correction) according to the correction curve.

Therefore, even when photographing with a flash at night, and there exist a short-distance object irradiated enough with a flash, such as a person, and a long-distance object which the flash does not reach, such as a background (landscape), in an image, sufficient gradation may be allocated to the dark area (long distance object) and the bright area (short distance object) in the recorded image, while maintaining the entire gradation. Accordingly, sufficient gradation expression may be provided for both bright and dark area in an image, namely good contrast may be secured.

In the present embodiment, the correction curve is generated from the standard gamma curve in such a manner that the allocated gradation is eliminated or decreased for the output luminance corresponding to the input luminance within the useless data range, and the remaining gradation is assigned for the output luminance corresponding to the input luminance within the useful data range. The correction curve also can be generated in such a way that a part of the gradation of the output luminance corresponding to the useless data range is allocated to the output luminance corresponding to the useful data range.

In the present embodiment, the gradation correction is performed to extend the respective useful data ranges, which correspond to the portions of the captured image, into the higher side of luminance. It can be performed to extend into the lower side of luminance, or both higher and lower sides of luminance.

Moreover, the processing of steps S6 through S19 in FIG. 3 searches the luminance ranges of all the distribution areas A and B (useful data ranges), and extends the range of the gradation of output luminance corresponding to the searched input luminance area. However, the extension can be executed in such a manner that one or more distribution areas locally distributed in the histogram is detected, and the range of the output side gradation corresponding to the input within the useful data range in the detected distribution areas is extended to eliminate or decrease the output gradation range except for the useful data range of the detected distribution areas.

Furthermore, the degree of extension can be different for each distribution area, when extending the gradation ranges of the output corresponding to the input within a plurality of useful data ranges, which are located locally in the histogram. In the case of distribution areas in contact with each other for example, the degree of extension for the brighter distribution area can be greater than the darker distribution area. In that case, when a correction curve is generated from the standard gamma curve such as shown in FIG. 5A, corrected curves such as shown in FIG. 5B are respectively generated for each distribution area by varying the target luminance (Target) for each distribution area and multiplying the standard gamma curves by different correction ratios (Ratios). The entire correction curve may be generated from a plurality of generated correction curves by employing the portions of the curves corresponding to the input of each distribution area (luminance range).

The processing related to the above-described changing of the gamma curve (processing at steps S6 through S19 in FIG. 3) is limited to photographing using a flash in the present embodiment. However, the processing may be applied to other cases in which photographing are performed without a flash.

Moreover, in the present embodiment, the processing to distinguish a portion of the object at a short distance and a portion of the object at a long distance, and the processing of the luminance correction for both portions of object, can be performed at high speed, by detecting processing to detect brightness distribution areas on the histogram of the captured image and the generation of the new gamma curve (rewriting of data in the gamma lookup table 22) based on the result of the detection. However, when it is configured that the distinction is accurately performed in another way based on the information except the histogram of the captured image, in addition to the rewriting the gamma look up table 22, the image processing to correct the luminance for each distinguished portions of the object can be applied respectively.

The above explanation relates to a case in which the present invention is applied to a digital camera. However, the present invention is not limited to the above case, and may be also applied to other image capturing device such as a digital video camera with a still image photographing function, a mobile telephone with a camera function, and a personal digital assistant (PDA) with a camera function. Moreover, the present invention may be also applied to an image capturing device with a configuration in which a captured image is outputted to other device without recording the captured image.

What is claimed is:

1. An image capturing apparatus, comprising:
an imaging element which captures an image of an object and outputs image data;
a generating unit which generates a histogram showing a luminance distribution of the image data output from the imaging element;
a detecting unit which detects a first range of luminance levels at which the number of pixels is more than a predetermined threshold level and a second range of luminance levels at which the number of pixels is not more than the predetermined threshold level; and
a correction unit which, (i) when an operation mode is set to a first mode, converts a luminance of the image data output from the imaging element into an output luminance according to a predetermined conversion characteristic, and (ii) when the operation mode is set to a second mode, converts a luminance of the image data into an output luminance in such a manner that an output luminance range corresponding to the first range is wider than an output luminance range according to the predetermined conversion characteristic and an output luminance range corresponding to the second range is narrower than an output luminance range according to the predetermined conversion characteristic;
wherein the correction unit comprises a determination unit which determines whether an image capturing condition is a predetermined condition in which there is a correlation between an area corresponding to an object in the image data output from the imaging element and an isolated luminance range distributed in the histogram;
wherein the operation mode is set to the second mode when the determination unit determines that the image capturing condition is the predetermined condition; and
wherein the operation mode is set to the first mode when the determination unit determines that the image capturing condition is not the predetermined condition.

2. The image capturing apparatus according to claim 1, wherein the predetermined condition is a condition in which there is a correlation between two areas corresponding to near and far objects in the image data and two isolated luminance ranges distributed on bright and dark areas in the histogram.

3. The image capturing apparatus according to claim 1, wherein the determination unit determines whether the image capturing condition is the predetermined condition, based on whether the imaging element captures the image of the object using a flash, and an instruction input by a user.

4. The image capturing apparatus according to claim 1, wherein the detecting unit detects a plurality of first ranges of luminance levels at which the number of pixels is more than the predetermined threshold level and a plurality of second ranges of luminance levels at which the number of pixels is not more than the predetermined threshold level.

5. An image capturing apparatus, comprising:
an imaging element which captures an image of an object and outputs image data;
a generating unit which generates a histogram showing a luminance distribution of the image data output from the imaging element;
a detecting unit which detects a distribution area distributed in the histogram generated by the generating unit; and
a first correction unit which corrects gradation by changing a luminance value of a pixel in a portion of the image data corresponding to the distribution area detected by the detecting unit such that a luminance difference between pixels is increased while a relative relation of the luminance value of the pixels is maintained;
a flash unit which irradiates the object with a flash light;
a computer which controls the generation unit, the detecting unit, and the first correction unit;
wherein the first correction unit corrects gradation when the flash unit irradiates the object with the flash light.

6. The image capturing apparatus according to claim 5, wherein the first correction unit extends a luminance range of the distribution area detected by the detecting unit into at least one of a higher luminance side and a lower luminance side.

7. The image capturing apparatus according to claim 6, wherein the first correction unit extends a luminance range of the distribution area detected by the detecting unit into a range of luminance in which no distribution area is detected by the detecting unit.

8. The image capturing apparatus according to claim 6, wherein the detecting unit detects a plurality of distribution areas distributed in the histogram generated by the generating unit, and the first correction unit corrects gradation of a plurality of pixel portions corresponding to the plurality of distribution areas detected by the detecting unit.

9. The image apparatus according to claim 8, wherein rates of increasing the luminance differences between pixels vary in the plurality of pixel portions corresponding to the distribution areas.

10. The image capturing apparatus according to claim 5, wherein the first correction unit corrects gradation by changing luminance values of pixels in the portion of the image data corresponding to the distribution area with different rates according to a predetermined correction curve in which a maximum luminance value of the pixel is changed to a predetermined luminance value.

11. The image capturing apparatus according to claim 10, further comprising a correction curve generating unit which generates the predetermined correction curve based on the histogram generated by the generating unit.

12. The image capturing apparatus according to claim 5, further comprising a second correction unit which corrects a conversion characteristic to convert the captured image of the object into the image data for whole image data acquired by the imaging element, and wherein the first correction unit increases the luminance difference for the pixel portion.

13. The image capturing apparatus according to claim 11, wherein the correction curve generating unit comprises:
a first generating unit which generates a temporary correction curve by changing a standard correction curve based on the histogram generated by the generating unit; and
a second generating unit which generates the predetermined correction curve by using the temporary correction curve which is generated by the first generating unit.

14. The image capturing apparatus according to claim 5, wherein the computer controls the first correction unit to perform a gradation correction when the imaging element captures the image under a predetermined capturing condition.

15. The image capturing apparatus according to claim 5, further comprising an image storing unit which stores the image data of the captured image obtained after a gradation correction is performed by the first correction unit.

16. A gradation correction method for an image capturing apparatus comprising an imaging element which captures an image of an object and outputs image data, the method comprising controlling a computer of the image capturing apparatus to perform functions of:

generating a histogram showing a luminance distribution of the image data output from the imaging element;

detecting a distribution area distributed in the generated histogram;

correcting gradation by changing a luminance value of a pixel in a portion of the image data corresponding to the detected distribution area such that a luminance difference between pixels is increased while a relative relation of the luminance value of the pixels is maintained; and irradiating the object with a flash light;

wherein the gradation is corrected when the object is irradiated with the flash light.

* * * * *